(12) United States Patent
Bruckman et al.

(10) Patent No.: US 9,185,151 B2
(45) Date of Patent: Nov. 10, 2015

(54) DEVICE, METHOD AND SYSTEM FOR MEDIA PACKET DISTRIBUTION

(75) Inventors: Leon Bruckman, Petah Tikva (IL); Eli Aloni, Zur Yigal (IL); David Zelig, Ramat Gan (IL); Gal Mor, Herzeliya (IL)

(73) Assignee: ORCKIT-CORRIGENT LTD., Tel Aviv (IL)

( * ) Notice: Subject to any disclaimer, the term of this patent is extended or adjusted under 35 U.S.C. 154(b) by 475 days.

(21) Appl. No.: 12/738,080

(22) PCT Filed: Oct. 22, 2008

(86) PCT No.: PCT/IL2008/001377
§ 371 (c)(1),
(2), (4) Date: Dec. 2, 2010

(87) PCT Pub. No.: WO2009/050714
PCT Pub. Date: Apr. 23, 2009

(65) Prior Publication Data
US 2011/0083146 A1    Apr. 7, 2011

Related U.S. Application Data

(60) Provisional application No. 60/999,242, filed on Oct. 16, 2007, provisional application No. 61/045,005, filed on Apr. 15, 2008.

(51) Int. Cl.
| | |
|---|---|
| *H04N 7/173* | (2011.01) |
| *H04L 29/06* | (2006.01) |
| *H04N 21/438* | (2011.01) |
| *H04N 21/6405* | (2011.01) |
| *H04N 21/6408* | (2011.01) |
| *H04N 21/81* | (2011.01) |

(Continued)

(52) U.S. Cl.
CPC ........ *H04L 65/4076* (2013.01); *H04L 65/4069* (2013.01); *H04L 65/60* (2013.01); *H04N 21/4384* (2013.01); *H04N 21/6405* (2013.01); *H04N 21/6408* (2013.01); *H04N 21/812* (2013.01); *H04N 21/2668* (2013.01); *H04W 72/005* (2013.01)

(58) Field of Classification Search
CPC .......... H04N 21/4384; H04N 21/6408; H04N 21/2668; H04N 21/6405; H04W 72/005; H04L 65/4076
See application file for complete search history.

(56) References Cited

U.S. PATENT DOCUMENTS

2004/0244058 A1* 12/2004 Carlucci et al. ............... 725/135
2005/0081244 A1  4/2005 Barrett (Continued)

*Primary Examiner* — Rong Le
(74) *Attorney, Agent, or Firm* — Peter A. Nieves; Sheehan Phinney Bass + Green

(57) ABSTRACT

There is provided a method device and system for streaming media content to a media presentation appliance. There may be provided an appliance specific media stream generator adapted to derive an appliance specific stream from a multicast media stream. The generator may convert a multicast media stream addressed to a set of media presentation appliances into either (1) one or more unicast media streams, wherein each unicast media stream is addressed to a separate media presentation appliance; or (2) a multicast media stream addressed to a subset of the set of media presentation appliances. In both cases, the media content within the derived media stream may be substantially identical to the media content of the original multicast media stream. The generator may also introduce content (e.g. advertising) into the derived media stream(s).

24 Claims, 12 Drawing Sheets

(51) Int. Cl.
*H04W 72/00* (2009.01)
*H04N 21/2668* (2011.01)

(56) References Cited

U.S. PATENT DOCUMENTS

| | | | |
|---|---|---|---|
| 2005/0193410 A1* | 9/2005 | Eldering | 725/34 |
| 2006/0064716 A1 | 3/2006 | Sull et al. | |
| 2006/0075449 A1 | 4/2006 | Jagadeesan et al. | |
| 2007/0008969 A1 | 1/2007 | Elstermann et al. | |
| 2007/0071239 A1 | 3/2007 | Fang et al. | |
| 2007/0121629 A1* | 5/2007 | Cuijpers et al. | 370/390 |
| 2007/0214490 A1 | 9/2007 | Cheng | |
| 2007/0250890 A1 | 10/2007 | Joshi et al. | |
| 2007/0258586 A1 | 11/2007 | Huang et al. | |
| 2008/0022084 A1 | 1/2008 | Raftelis et al. | |
| 2008/0216116 A1* | 9/2008 | Pekonen et al. | 725/39 |
| 2008/0235722 A1 | 9/2008 | Baugher et al. | |
| 2008/0310496 A1 | 12/2008 | Fang et al. | |
| 2009/0168679 A1* | 7/2009 | Benjamim et al. | 370/312 |

\* cited by examiner

DEVICE, METHOD AND SYSTEM FOR MEDIA PACKET DISTRIBUTION

FIELD OF THE INVENTION

This application relates generally to the field of multimedia digital communication. More specifically, the present invention relates to a method, system and device for providing an Internet Protocol Media Stream to a subscriber.

BACKGROUND

IPTV (Internet Protocol Television) is a system where a digital television service is delivered by using Internet Protocol over a network infrastructure, which may include delivery by a broadband connection. A general definition of IPTV is television content that, instead of being delivered through traditional broadcast and cable formats, is received by the viewer through the technologies used for computer networks.

For residential users, IPTV is often provided in conjunction with Video on Demand and may be bundled with Internet services such as Web access and Voice over IP ("VoIP"). The commercial bundling of IPTV, VoIP and Internet access is referred to as "Triple Play" service (adding mobility is called "Quadruple Play"). IPTV is typically supplied by a service provider using a closed network infrastructure. This closed network approach is in competition with the delivery of TV content over the public Internet, called Internet Television. In businesses, IPTV may be used to deliver television content over corporate LANs.

In 1994, ABC's World News Now was the first television show to be broadcast over the Internet, using the CU-SeeMe videoconferencing software. The term IPTV first appeared in 1995 with the founding of Precept Software by Judith Estrin and Bill Carrico. Precept designed and built an internet video product named "IP/TV". IP/TV was an MBONE compatible Windows and Unix based application that moved single and multi-source audio/video traffic, ranging from low to DVD quality, using both unicast and IP multicast RTP/RTCP. The software was written primarily by Steve Casner, Karl Auerbach, and Cha Chee Kuan. Precept was acquired by Cisco Systems in 1998. Cisco retains the "IP/TV" trademark.

Internet radio company AudioNet started the first continuous live webcasts with content from WFAA-TV in January, 1998 and KCTU-LP on Jan. 10, 1998. Kingston Communications, a regional telecommunications operator in UK, launched KIT (Kingston Interactive Television), an IPTV over DSL broadband interactive TV service in September 1999 after conducting various TV and VoD trials. The operator added additional VoD service in October 2001 with Yes TV, a provider of VoD content. Kingston was one of the first companies in the world to introduce IPTV and IP VOD over ADSL.

In the past, this technology has been restricted by low broadband penetration. In the coming years, however, residential IPTV is expected to grow at a brisk pace as broadband was made available to more than 200 million households worldwide in the year 2005, projected to grow to 400 million by the year 2010. Many of the world's major telecommunications providers are exploring IPTV as a new revenue opportunity from their existing markets and as a defensive measure against encroachment from more conventional Cable Television services. In the mean time, there are thousands of IPTV installations within schools, corporations, and other institutions that do not require the use of wide area connectivity.

It is important to note that historically there have been many different definitions of "IPTV" including elementary streams over IP networks, transport streams over IP networks and a number of proprietary systems. Although (in Mid 2007) it is premature to say that there is a full consensus of exactly what IPTV should mean, there is no doubt that the most widely used definition today is for single or multiple program transport streams which are sourced by the same network operator that owns or directly controls the "Final Mile" to the consumer's premises. This control over delivery enables a guaranteed quality of service, and also allows the service provider to offer an enhanced user experience such as better program guide, interactive services etc.

In 2006, AT&T launched its U-Verse IPTV service. Comprised of a national head end and regional video serving offices, AT&T offered over 300 channels in 11 cities with more to be added in 2007 and beyond. While using IP protocols, AT&T has built a private IP network exclusively for video transport. IPTV uses a two-way digital broadcast signal sent through a switched telephone or cable network by way of a broadband connection and a set-top box programmed with software (much like a cable or DSS box) that can handle viewer requests to access to many available media sources.

FIG. 1 shows an exemplary IPTV distribution network architecture, starting from a "Headend" on the left side of the figure, and culminating with a viewer set-top boxes ("STB") and other media presentation appliances on the right side of the figure. Currently, California based UTStarcom, Inc. and Tennessee based Worley Consulting are two companies offering end-to-end networking infrastructure for IPTV-based services.

IPTV covers both live TV (multicasting) as well as stored video (Video on Demand VOD). The playback of IPTV requires either a personal computer or a set-top box connected to a TV. Video content is typically compressed using either a MPEG-2 or a MPEG-4 codec and then sent in an MPEG transport stream delivered via IP Multicast in case of live TV or via IP Unicast in case of Video on Demand. IP Multicast is a method in which information can be sent to multiple computers at the same time. The newly released (MPEG-4) H.264 codec is increasingly used to replace the older MPEG-2 codec.

In standards-based IPTV systems, the primary underlying protocols used for Live TV is using IGMP version 2 for connecting to a multicast stream (TV channel) and for changing from one multicast stream to another multicast stream (TV channel change). Video on Demand ("VOD") generally uses the Real Time Streaming Protocol (RTSP). Currently, the only alternatives to IPTV are traditional TV distribution technologies such as terrestrial, satellite and cable. However, cable can be upgraded to two-way capability and can thus also carry IPTV.

Network Personal Video Recording is a consumer service where real-time broadcast television is captured in the network on a server allowing the end user to access the recorded programs on the schedule of their choice, rather than being tied to the broadcast schedule. The NPVR system provides time-shifted viewing of broadcast programs, allowing subscribers to record and watch programs at their convenience, without the requirement of a truly personal PVR device. It could be compared as a "PVR that is built into the network"—however that would be slightly misleading unless the word "Personal" is, of course, changed to "Public" for this context.

The IP-based video distribution platform offers significant advantages over traditional distribution platform, including the ability to integrate television with other IP-based services like high speed Internet access and VoIP. A switched IP network also allows for the delivery of significantly more content and functionality. In a typical TV or satellite network, using broadcast video technology, all the content constantly flows downstream to each customer, and the customer switches the content at the set-top box. The customer can select from as many choices as the telecomms, cable or satellite company can stuff into the "pipe" flowing into the home. A switched IP network works differently. Content remains in the network, and only the content the customer selects is sent into the customer's home. That frees up bandwidth, and the customer's choice is less restricted by the size of the "pipe" into the home.

Because IPTV requires real-time data transmission and uses the Internet Protocol, it is sensitive to packet loss and delays if the IPTV connection is not fast enough, or picture break-up or loss if the streamed data is unreliable. This latter problem has proved particularly troublesome when attempting to stream IPTV across wireless links. Improvements in wireless technology are now starting to provide equipment to solve the problem.

The venerable set-top box, on its way out in the cable world, made resurgence in IPTV systems. The box connects to the home DSL line and is responsible for reassembling the packets into a coherent video stream and then decoding the contents. Computers could do the same job, but most people still don't have an always-on PC sitting beside the TV, so the box has made a comeback.

As shown in FIG. 1, most video enters the system at the telco's national headend, where network feeds are pulled from satellites and encoded if necessary (often in MPEG-2, though H.264 and Windows Media are also possibilities). The video stream is broken up into IP packets and dumped into the telco's core network, which is a massive IP network that handles all sorts of other traffic (data, voice, etc.) in addition to the video. The video streams are received by a local office, which is adapted to deliver the video streams to the end users. (i.e. subscriber media presentation appliances). The local office may add local content (such as TV stations, advertising, and video on demand) to the received video streams. The local office is also adapted to house and operate the IPTV middleware. The middleware software stack handles user authentication, billing, channel change requests, VoD requests, and "last mile" distribution/routing/switching of the content bearing data streams.

Channels in the lineup are multicast from the national headend to local offices over a high capacity data work. There is usually a bottleneck in delivering content from the local offices to the subscriber residence due to the usually low capacity local loop (e.g. local DSL loop). Although Cable systems may be able to do so (since their bandwidth for a neighborhood can be 4.5 Gbps), even the newest ADSL2+ technology tops out at around 25 Mbps (and this speed drops quickly as distance from the DSLAM [DSL Access Multiplier] grows).

Bandwidth on the local loop (also known as "last mile") is growing, and in some metro areas is considerably higher than 25 Mbps, but for now, most local IPTV offices overcome the problem of limited bandwidth on the local loop by multicasting a selected channel to some or all of the set-top boxes which have selected the given channel. That is, when a user changes the channel on their set-top box, the box does not "tune" a channel like a cable system. (There is in fact no such thing as "tuning" anymore—the box is simply an IP receiver.) What happens instead is that the box switches channels by using the IP Group Membership Protocol (IGMP) to join a new multicast group. When the local office receives this request, it checks whether the user is authorized to view this new channel. Upon receiving authorization, the local office directs the routers to add that particular user to the channel's distribution list. In this way, only signals that are currently being watched are actually being sent from the local office to the DSLAM and on to the user.

The present problem with multicasting content to the user's IP based media presentation device (e.g. STB) is two fold: (1) Channel zapping time-delay, and (2) Individual ad placement restrictions. Channel zapping time is mainly concerned with broadcast channels, which are typically delivered on the network as IP multicast streams in IPTV networks, where each IP multicast represents a specific channel. The use of multicast across the network is very efficient, as the traffic is sent only once up to the network edge, and only duplicated on a per-customer service in the last access device (DSLAM, PON OLT, Access switch, etc.). Although, there are number of sources creating long channel zapping time-delays, most of the zapping time in a well-engineered network is caused by waiting in the Set Top Box (STB) for the next available I-frame in the MPEG-2 stream (i.e. the size of the MPEG-2 GOP (group of pictures) in seconds), or IDR picture on the H.264 stream. In H.264 for example, IDR pictures may be up to 5 seconds distant, meaning that when a user is requesting a new channel, even if the network reacts very fast to the IGMP request, if the STB starts to get the stream right after the current MPEG-2 GOP/H.264 video sequence start (the I-frame/IDR picture) it must wait up to 5 seconds until it can display the picture on the screen.

Targeted Ad (commercial) insertion is also a big challenge in IPTV networks. Current ad insertion methods rely on a centralized ad insertion server in the main distribution hubs of the networks. This implies that for multicast streams, the commercials are placed based on large geographic areas, without per-user granularity, or per region. If per-user ad insertion is needed, than the multicast traffic must become unicast traffic and would create bandwidth explosion on the network.

Thus, there is a need in the field of IPTV for improved methods, systems and devices for distributing content to user media presentation devices.

SUMMARY OF THE INVENTION

The present invention is a method device and system for streaming media content (e.g. audio, video and multimedia) to a media presentation appliance (e.g. set-top box). According to some embodiments of the present invention, there may be provided an appliance specific media stream generator adapted to derive an appliance specific media stream from a multicast media stream. According to some embodiments of the present invention, the generator may convert a multicast media stream addressed to a set of media presentation appliances (i.e. set of appliances connected to one or more branches of a media stream distribution network) into either: (1) one or more uni-cast media streams, wherein each uni-cast media stream is addressed to a separate media presentation appliance; or (2) a multicast media stream addressed to a subset of the set of media presentation appliances. In both cases, the media content within the derived media stream may be substantially identical to the media content of the original multicast media stream. According to some embodiments of the present invention, however, the generator may introduce content (e.g. advertising) into the derived media stream(s).

According to some embodiments of the present invention, a media presentation appliance may consistently receive a generator derived media stream. While according to further embodiments of the present invention, the media presentation appliance may consistently receive a multicast media stream, and may receive a generator derived media stream during only specific operational phases of the media presentation appliance. One example of a specific operational phase may be when the media presentation device is transitioning from a first multicast media stream (e.g. channel 5) to a second multicast media stream (e.g. channel 50).

According to some embodiments of the present invention, there may be provided a media stream switch adapted to switch the source of a media presentation appliance between a multicast media stream and an appliance specific media stream generated by an appliance specific media stream generator. The switch may change the source media stream of a given media presentation appliance responsive to control logic functionally coupled, or otherwise associated, with the: (1) switch, (2) generator, and (3) media presentation appliance. The control logic may also be coupled, or functionally associated, with: (1) a network operator control system, and (2) an advertising distribution controller/scheduler.

According to some embodiments of the present invention, an appliance specific media stream generator may include or otherwise be functionally associated with: (1) a multicast media stream de-packetizing module, (2) a multicast media stream content extractor, (3) a content editing module, and (4) a packetizing module. The depacketizing module may receive a multicast media stream and may depacketize the media stream. Optionally, a multicast media stream content extractor may extract the content within the received multicast packets into an editable format. A content editing module may edit extracted content, for example by inserting advertising or other content into the extracted content. A packetizing module may packetize the content into one or more (unicast of multicast) media streams, wherein the packetizing module appends header(s) to the one or more media stream including an identifier for each relevant media presentation appliance(s).

According to some embodiments of the present invention, a media presentation appliance may request from a media stream distribution network a changeover from a first multicast media stream (e.g. Channel 5) to a second multimedia stream (e.g. Channel 50). As part of the transition from the first multicast media stream to the second multicast stream, an identifier of the media presentation appliance may be added to the second media stream and removed from the first media stream. According to further embodiments of the present invention, during a transitional period between the media presentation appliance ceasing to present media associated with the first multicast media stream and the media presentation device receiving a renderable portion of the second multicast media stream, the generator may provide the media presentation device with a derived media stream based on the second multicast media stream. During the transitional period, a switch may change the source media stream of the presentation device to be the stream produced by the generator. According to some embodiments of the present invention, the generator may include, or be otherwise functionally associated with, a data buffer adapted to cyclically store renderable portions of the second multicast media stream, such that the generator may use the stored data to produce and transmit to the media presentation appliance a media stream which is correlated with the second multicast media stream and which is renderable substantially in real-time. After the transitional period, the switch may change the source media stream of the presentation device to the second multicast media stream.

According to some embodiments of the present invention, an IPTV distribution node may include a buffering module ("cyclic buffer module") which may include dedicated buffer(s) for each channel. According to yet further embodiments of the present invention, each buffer may be adapted to store at least one MPEG Group Of Pictures ("GOP") or H.264/AVC video sequences.

According to some embodiments of the present invention, upon receiving a channel request ("zapping") from a STB, the buffering module may associate an intra frame with the STB, the intra frame may be associated with the buffer which is dedicated to the requested channel. According to further embodiments of the present invention, the buffering module may associate the intra frame with the STB based on parameters of the channel request (e.g. encoding information).

According to some embodiments of the present invention, the buffering module may determine whether the associated intra frame has all the preceding meta-data which is needed for completing the zapping request, i.e. PAT tables, PMT tables, sequence header, CAT table etc. According to yet further embodiments of the present invention, if the intra frame is missing some of the preceding needed Meta-Data the buffering module may be adapted to edit the intra frame preceding headers/units and add the missing Meta-Data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
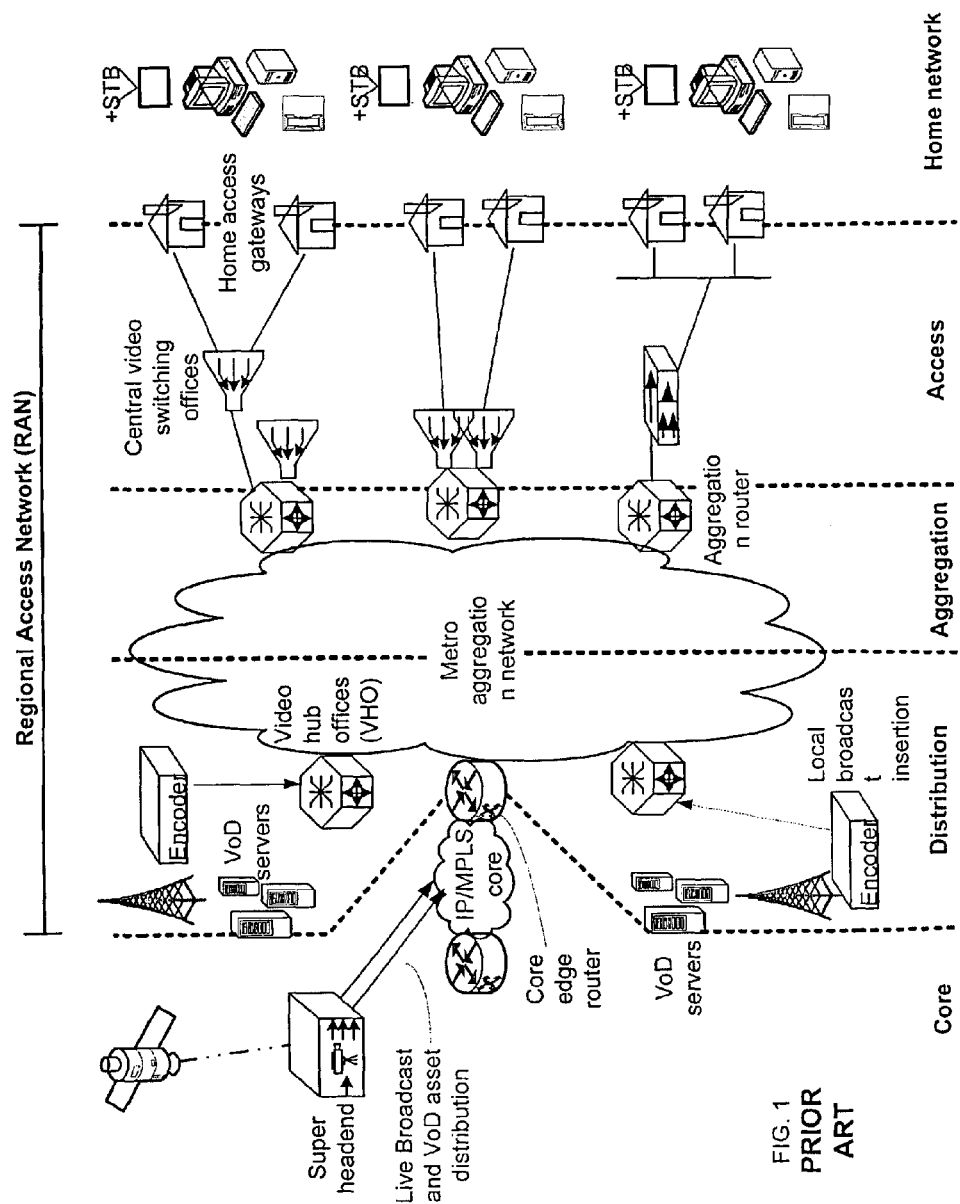
FIG. 1 is an exemplary IPTV distribution network architecture, starting from a "Headend" on the left side of the figure, and culminating with a viewer set-top boxes ("STB") and other media presentation appliances on the right side of the figure in accordance with the prior art.

According to some embodiments of the present invention, the controller may be adapted to monitor incoming packets to the channel buffers module. The controller may store the arrival time of each packet and may regulate the transmission time of the packets to the Set Top Boxes based on the arrival time.

According to some embodiments of the present invention, upon receiving a channel request from a Set Top Box ("STB"), the controller may be adapted to assign a pointer ("exit pointer") to the STB. The pointer may be directed to a location in the channel buffer ("zapping buffer") that contains the requested video sequence or video GOP (e.g. the last received video sequence/video GOP).

According to some embodiments of the present invention, a zapping buffer may be adapted to manage a plurality of exit pointers. According to further embodiments of the present invention, there are several techniques for managing large number of exit pointers from a zapping buffer:
  a. an exit pointer per user; and
  b. exit pointer per time interval.

An exit pointer per user has scalability problems:
  a. Processing—The buffer may need to manage long list of read pointers that may not be served on time due to processing limitations
  b. Memory bandwidth—When time arrives to transmit a packet from the zapping buffer, each exit pointer performs a read operation from the zapping memory, increasing the number of read operations means increased memory bandwidth consumption that may not be available.

According to some embodiments of the present invention, an exit pointer per time interval technique solves the problems discussed hereinabove, the zapping buffer may assign an exit pointer per time interval (e.g. T seconds, T most probably be fraction of second), meaning, all users that zapped to a specific video program during the time interval will be served by the same exit pointer, hence limiting the number of exit pointers that the zapping buffer is required to manage, and significantly reducing the read operation bandwidth consumption from the zapping memory as the exit pointer performs a single read operations for all users on the same time interval.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention is a method device and system for streaming media content (e.g. audio, video and multimedia) to a media presentation appliance (e.g. set-top box). According to some embodiments of the present invention, there may be provided an appliance specific media stream generator adapted to derive an appliance specific media stream from a multicast media stream. According to some embodiments of the present invention, the generator may convert a multicast media stream addressed to a set of media presentation appliances (i.e. set of appliances connected to one or more branches of a media stream distribution network) into either: (1) one or more uni-cast media streams, wherein each uni-cast media stream is addressed to a separate media presentation appliance; or (2) a multicast media stream addressed to a subset of the set of media presentation appliances. In both cases, the media content within the derived media stream may be substantially identical to the media content of the original multicast media stream. According to some embodiments of the present invention, however, the generator may introduce content (e.g. advertising) into the derived media stream(s).

According to some embodiments of the present invention, a media presentation appliance may consistently receive a generator derived media stream. While according to further embodiments of the present invention, the media presentation appliance may consistently receive a multicast media stream, and may receive a generator derived media stream during only specific operational phases of the media presentation appliance. One example of a specific operational phase may be when the media presentation device is transitioning from a first multicast media stream (e.g. channel 5) to a second multicast media stream (e.g. channel 50).

According to some embodiments of the present invention, there may be provided a media stream switch adapted to switch the source of a media presentation appliance between a multicast media stream and an appliance specific media stream generated by an appliance specific media stream generator. The switch may change the source media stream of a given media presentation appliance responsive to control logic functionally coupled, or otherwise associated, with the: (1) switch, (2) generator, and (3) media presentation appliance. The control logic may also be coupled, or functionally associated, with: (1) a network operator control system, and (2) an advertising distribution controller/scheduler.

According to some embodiments of the present invention, an appliance specific media stream generator may include or otherwise be functionally associated with: (1) a multicast media stream de-packetizing module, (2) a multicast media stream content extractor, (3) a content editing module, and (4) a packetizing module. The depacketizing module may receive a multicast media stream and may depacketize the media stream. Optionally, a multicast media stream content extractor may extract the content within the received multicast packets into an editable format. A content editing module may edit extracted content, for example by inserting advertising or other content into the extracted content. A packetizing module may packetize the content into one or more (unicast of multicast) media streams, wherein the packetizing module appends header(s) to the one or more media stream including an identifier for each relevant media presentation appliance(s).

According to some embodiments of the present invention, a media presentation appliance may request from a media stream distribution network a changeover from a first multicast media stream (e.g. Channel 5) to a second multimedia stream (e.g. Channel 50). As part of the transition from the first multicast media stream to the second multicast stream, an identifier of the media presentation appliance may be added to the second media stream and removed from the first media stream. According to further embodiments of the present invention, during a transitional period between the media presentation appliance ceasing to present media associated with the first multicast media stream and the media presentation device receiving a renderable portion of the second multicast media stream, the generator may provide the media presentation device with a derived media stream based on the second multicast media stream. During the transitional period, a switch may change the source media stream of the presentation device to be the stream produced by the generator. According to some embodiments of the present invention, the generator may include, or be otherwise functionally associated with, a data buffer adapted to cyclically store renderable portions of the second multicast media stream, such that the generator may use the stored data to produce and transmit to the media presentation appliance a media stream which is correlated with the second multicast media stream and which is renderable substantially in real-time. After the transitional period, the switch may change the source media stream of the presentation device to the second multicast media stream.

According to some embodiments of the present invention, an IPTV distribution node may include a buffering module ("cyclic buffer module") which may include dedicated buffer(s) for each channel. According to yet further embodiments of the present invention, each buffer may be adapted to store at least one MPEG-2 Group Of Pictures ("GOP") and/or H.264/AVC video sequences.

According to some embodiments of the present invention, upon receiving a channel request ("zapping") from a STB, the buffering module may associate an intra frame with the STB, the intra frame may be associated with the buffer which is dedicated to the requested channel. According to further embodiments of the present invention, the buffering module may associate the intra frame with the STB based on parameters of the channel request (i.e. request time stamp, etc.).

According to some embodiments of the present invention, the buffering module may determine whether the associated intra frame has all the meta-data which is needed for completing the zapping request, i.e. PAT tables, PMT tables, sequence header, CAT table etc. According to yet further embodiments of the present invention, if the intra frame is missing some of the needed Meta-Data the buffering module may be adapted to edit the preceding intra frame information and add the missing Meta-Data.

Figure 2:
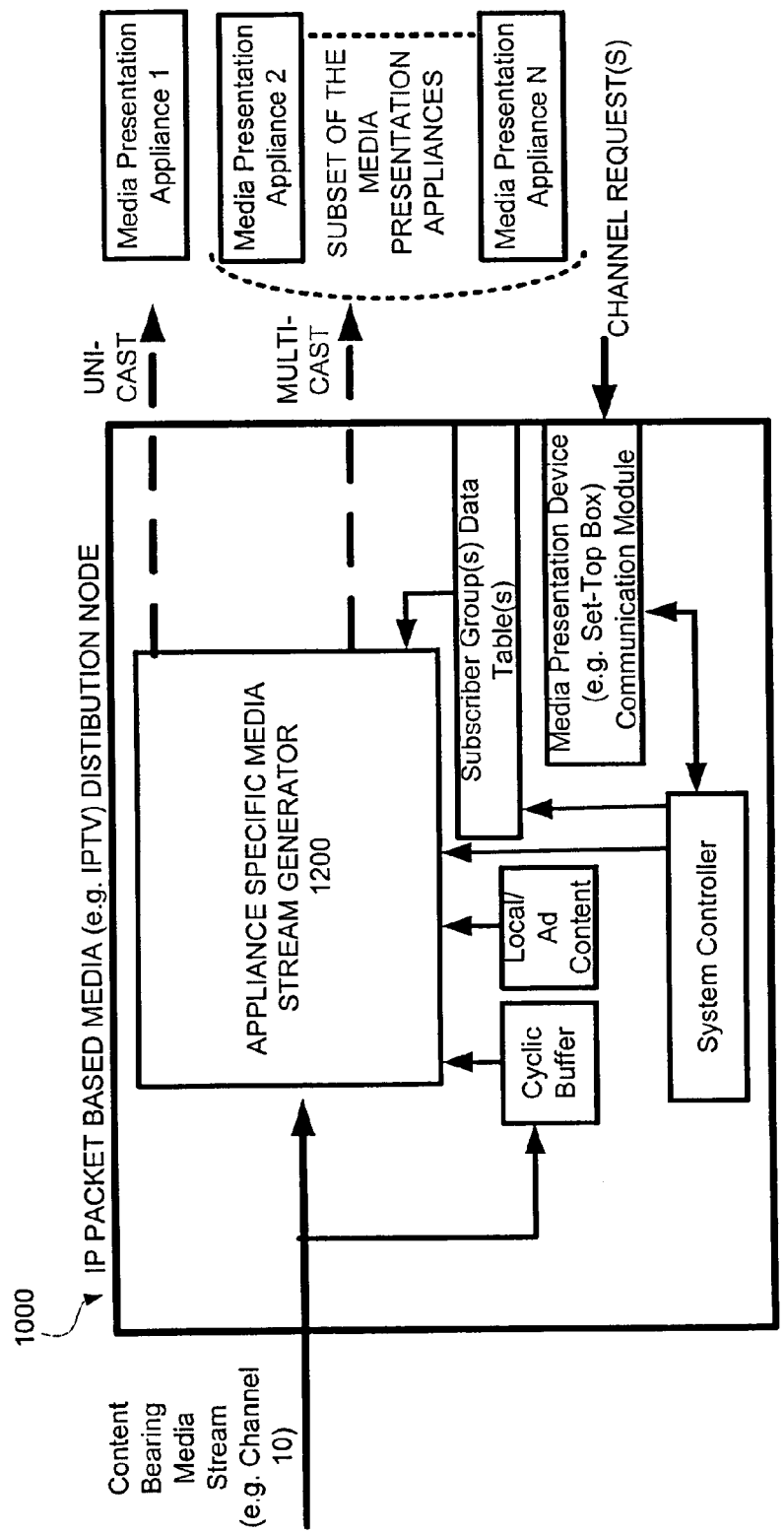
FIG. 2 is a schematic block diagram of an IP packet based media distribution node adapted to receive media stream(s) and to derive multicast and/or unicast media stream(s) in accordance with some embodiments of the present invention.

Turning now to FIG. 2, there is shown a schematic block diagram of an IP packet based media distribution node 1000 (e.g. audio, video and multimedia) adapted to receive media stream(s) and to derive multicast and/or unicast media stream(s) in accordance with some embodiments of the present invention. According to some embodiments of the present invention, the system may include: (1) an appliance specific media stream generator 1200, (2) a cyclic buffer, (3) a local/ad content module, (4) a subscriber group(s) data table(s), (5) a media presentation device communication module and (6) a system controller. According to some embodiments of the present invention, an appliance specific media stream generator 1200 may be adapted to derive one or more appliance specific media streams from a multicast media stream. According to yet further embodiments of the present invention, the appliance specific media stream generator may be adapted to derive both uni-cast streams and multicast streams.

According to some embodiments of the present invention, system 1000 may be further adapted for streaming media content (e.g. audio, video and multimedia) to one or more media presentation appliances (e.g. set-top box) in accordance with some embodiments of the present invention. According to some embodiments of the present invention, system 1000 may include an appliance specific media stream generator 1200 adapted to derive one or more appliance specific media streams from a multicast media stream. According to some embodiments of the present invention, generator 1200 may convert a multicast media stream addressed to a set of media presentation appliances (i.e. set of appliances connected to one or more branches of a media stream distribution network) into either: (1) one or more uni-cast media streams, wherein each uni-cast media stream is addressed to a separate media presentation appliance; or (2) a multicast media stream addressed to a subset of the set of media presentation appliances.

Figure 3:
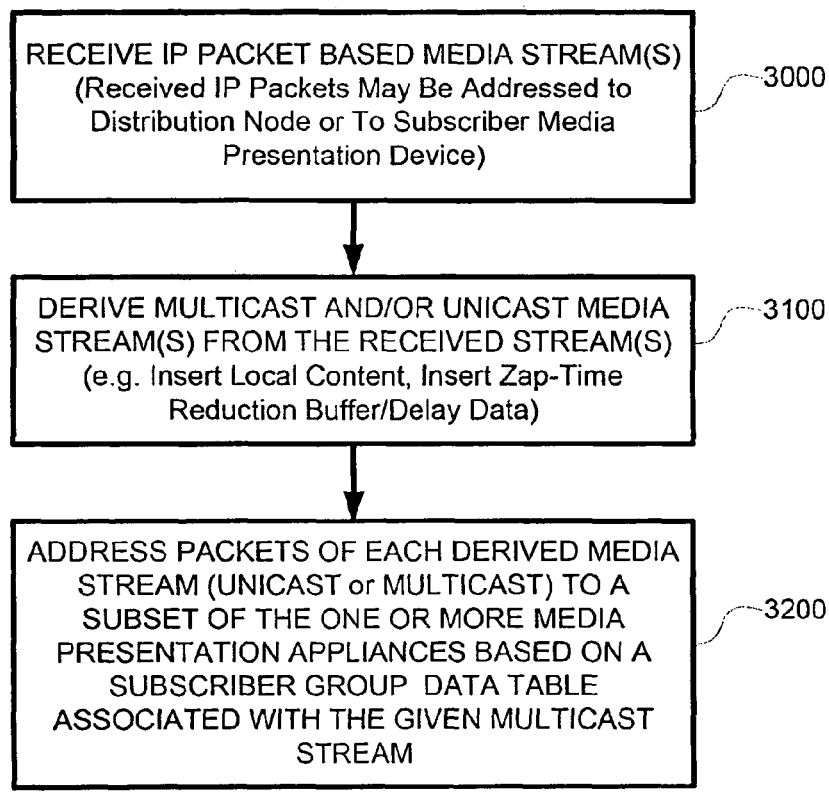
FIG. 3 is a flow chart depicting the steps of an exemplary IP packet based media distribution node adapted to receive media stream(s) and to derive multicast and/or unicast media stream(s) in accordance with some embodiments of the present invention.

The functionality of the block diagram shown in FIG. 2 may best be described in conjunction with FIG. 3, there is shown a flow chart depicting the steps of an exemplary system for streaming media content 1000. According to some embodiments of the present invention, system 1000 may be adapted to receive IP packets based media stream(s), the received IP packets may be addressed to distribution node or to subscriber media presentation device (step 3000). According to further embodiments of the present invention, system 1000 may be adapted to derive multicast and/or unicast media stream(s) from the received streams(s), for example, inserting local content, inserting zap time reduction and/or buffer/delay data. According to yet further embodiments of the present invention, system 1000 may address packets of each derived media stream (unicast or multicast) to a subset of the one or more media presentation appliances based on a subscriber group data table associated with the given multicast stream.

Figure 4:
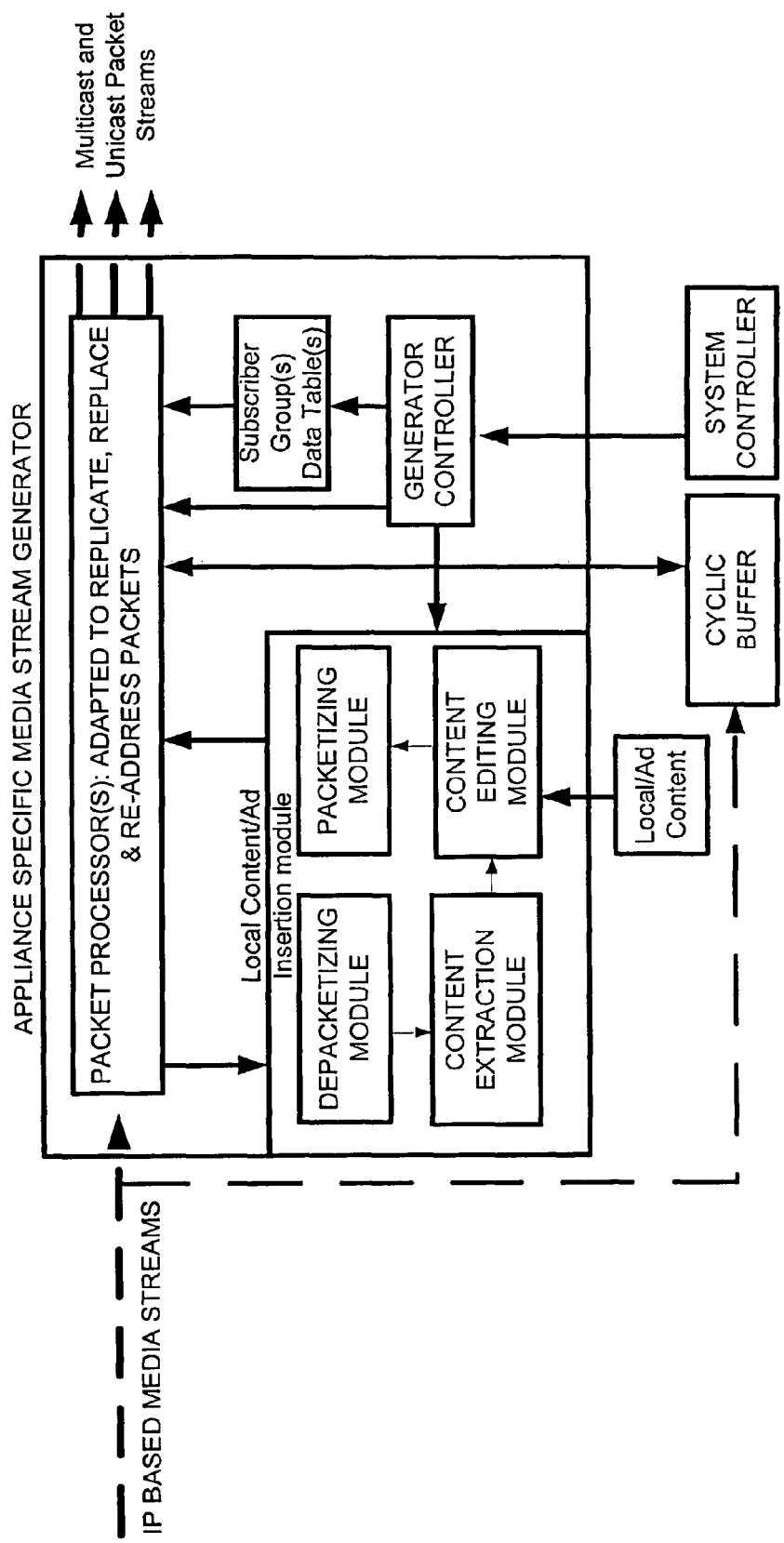
FIG. 4 is a schematic block diagram of an appliance specific media stream generator adapted to derive multicast and/or unicast media stream(s) in accordance with some embodiments of the present invention.
Figure 5:
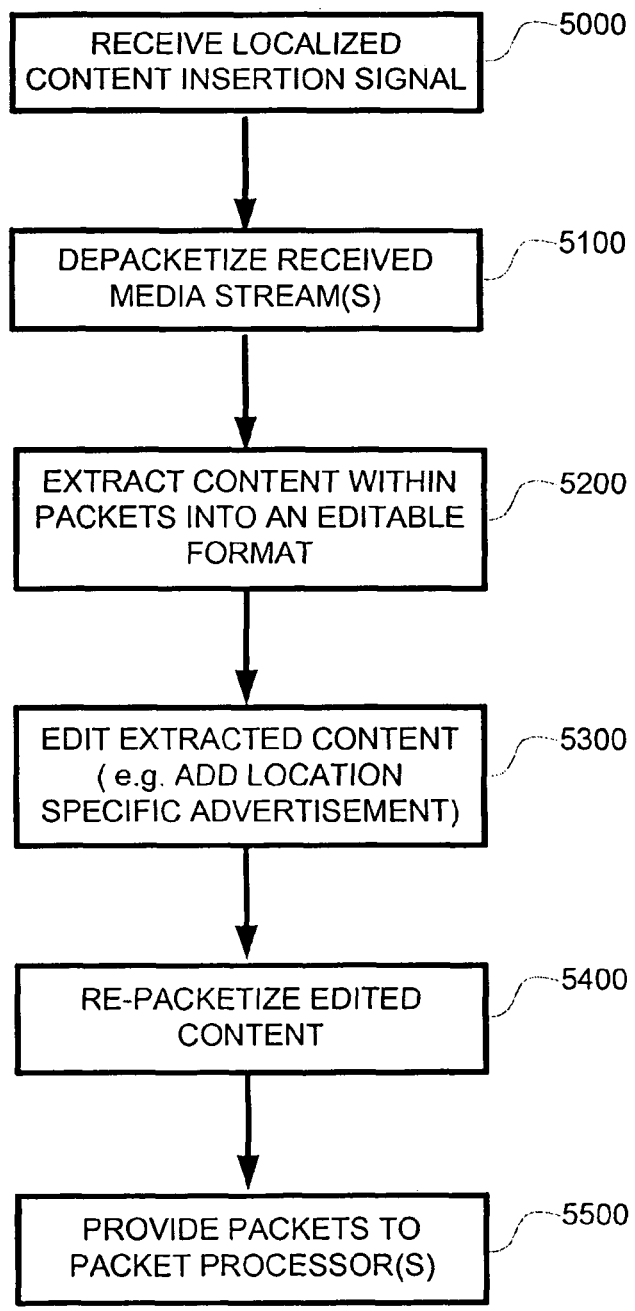
FIG. 5 is a flow chart depicting the steps of an appliance specific media stream generator adapted to derive multicast and/or unicast media stream(s) in accordance with some embodiments of the present invention.

Turning now to FIG. 4, there is shown a block diagram of an appliance specific media stream generator which may be adapted to derive multicast and/or unicast media stream(s) in accordance with some embodiments of the present invention. According to some embodiments of the present invention an appliance specific media stream generator may include: (1) packet processor(s), (2) local content/ad insertion module, (3) subscriber group data tables and (4) a controller. According to yet further embodiments of the present invention, appliance specific media stream generator may communicate with a system controller and with one or more cyclic buffers as explained hereinabove. The functionality of the block diagram shown in FIG. 4 may best be described in conjunction with FIG. 5, there is shown a flow chart depicting the steps of an appliance specific media stream generator in accordance with some embodiments of the present invention.

According to some embodiments of the present invention, appliance specific media stream generator may be adapted to receive localized content insertion signal (step 5000). The localized content insertion signal may indicate that an opportunity is available in the transmitted stream for inserting local based content. According to yet further embodiment of the present invention, the appliance specific media stream generator may be adapted to depacketize received media stream(s) (step 5100). According to yet further embodiment of the present invention, the appliance specific media stream generator may be adapted to extract content within packets into an editable format (step 5200). According to yet further embodiment of the present invention, the appliance specific media stream generator may be adapted to edit extracted content using the content editing module, for example, adding location specific content to the extracted content (step 5300). According to yet further embodiment of the present invention, the appliance specific media stream generator may be adapted to re-packetize the edited content (step 5300). According to yet further embodiment of the present invention, the appliance specific media stream generator may be adapted to provide packets to the packets processors (step 5500). According to some embodiments of the present invention, steps 5100, 5200, 5300 and 5400 may be performed by the local content/ad insertion module.

Figure 6:
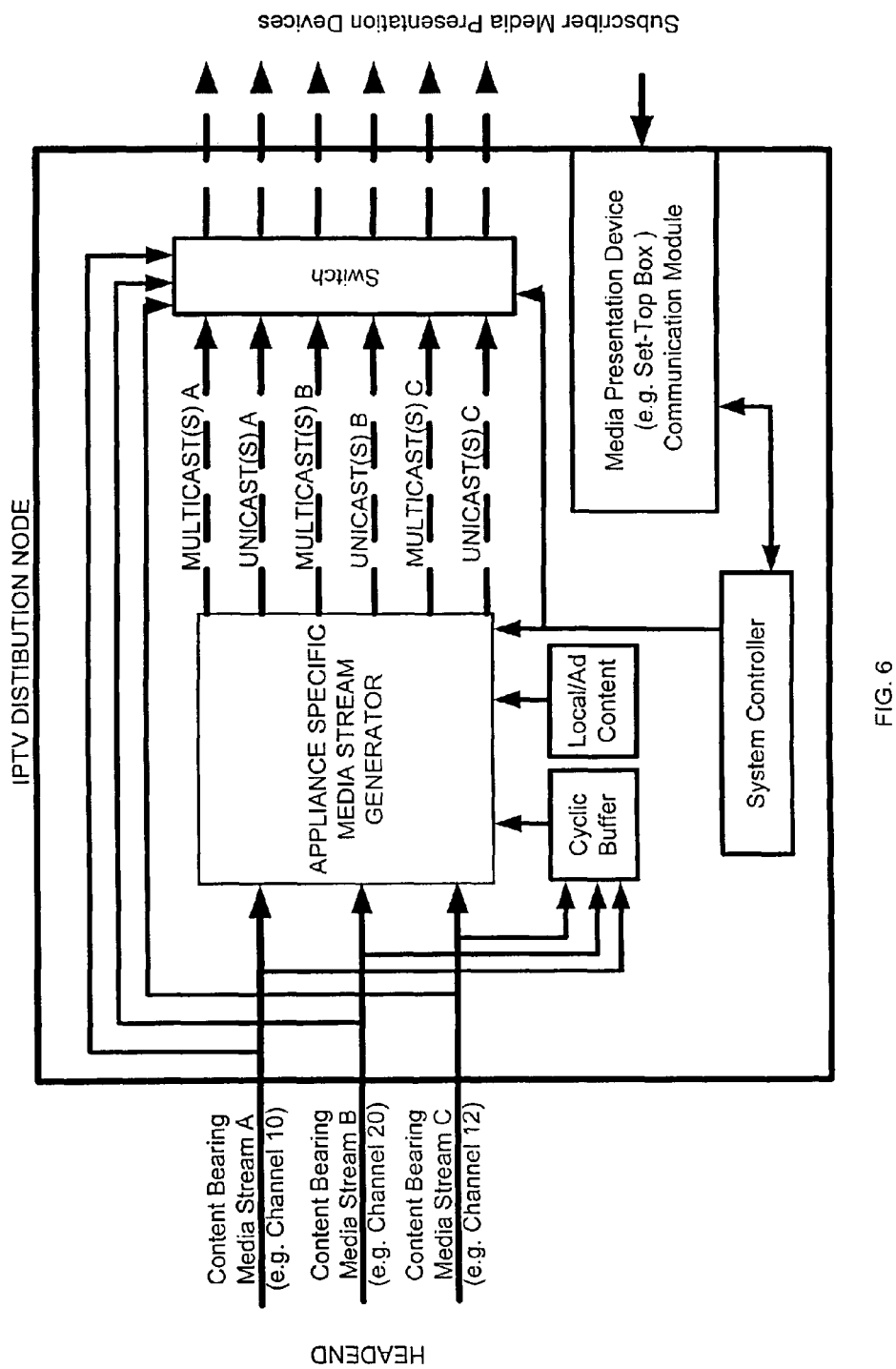
FIG. 6 is a block diagram of an IPTV distribution node in accordance with some embodiments of the present invention.
Figure 7:
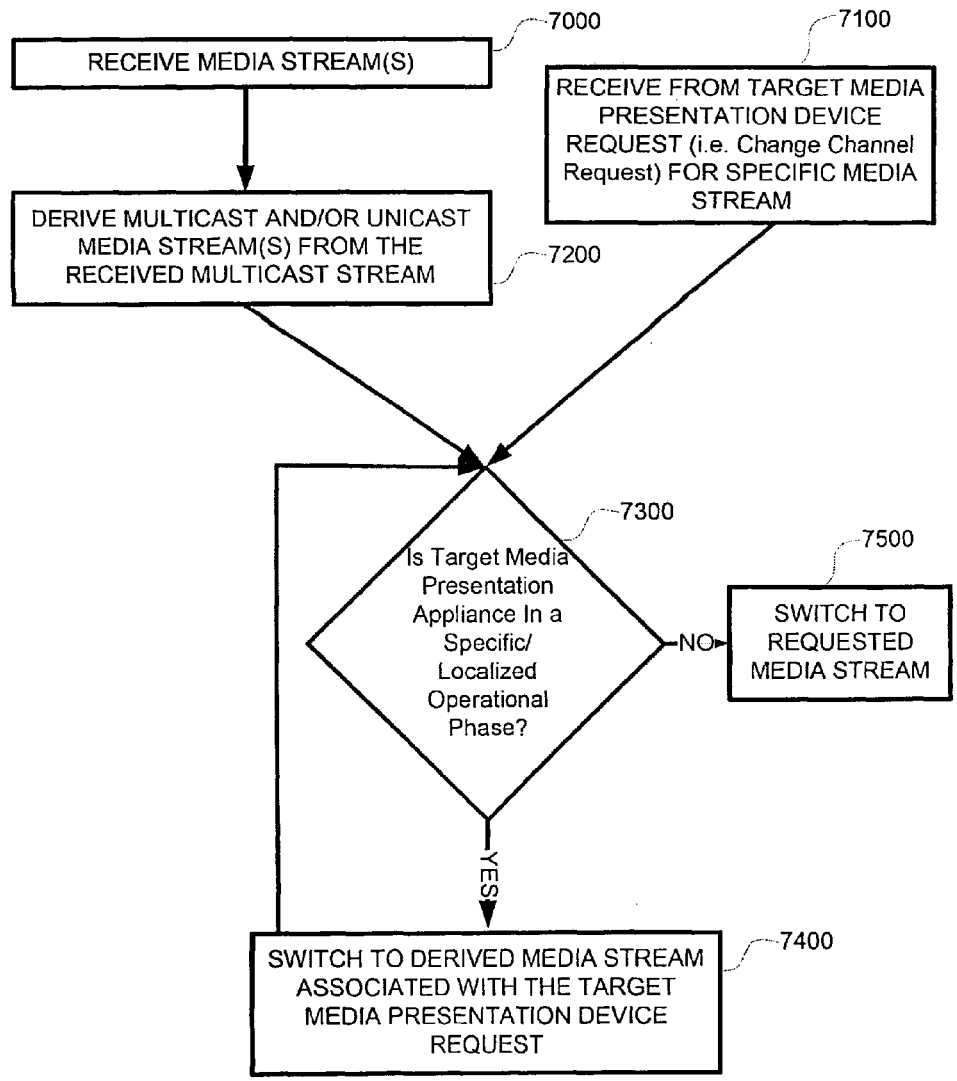
FIG. 7 is a flow chart depicting the steps of an IPTV distribution node in accordance with some embodiments of the present invention.

Turning now to FIG. 6, there is shown a block diagram of an IPTV distribution node in accordance with some embodiments of the present invention. The IPTV distribution node may include: (1) an appliance specific media stream generator, (2) a switch, (3) a cyclic buffer, (4) a local/ad content unit, (5) a system controller and (6) a media presentation device communication module. The functionality of the block diagram shown in FIG. 6 may best be described in conjunction with FIG. 7, there is shown a flow chart depicting the steps of an IPTV distribution node in accordance with some embodiments of the present invention.

According to some embodiments of the present invention, the IPTV distribution node may be adapted to receive one or more media streams (step 7000). According to yet further embodiments of the present invention, the IPTV distribution node may be adapted to receive from a media presentation device a request for a specific media stream (step 7100), an exemplary request may be a change channel request ("zap").

According to some embodiments of the present invention, the IPTV distribution node may be adapted to derive multicast and/or unicast media stream(s) from the received multicast stream (step 7200).

According to some embodiments of the present invention, the IPTV distribution node may be adapted to determine whether the target media presentation appliance is in a specific/localized operation phase (step 7300). According to some embodiments of the present invention, if the target media presentation appliance is in a specific/localized operation phase, the IPTV distribution node may be adapted to switch to derived media stream associated with the target media presentation device request (step 7400).

According to some embodiments of the present invention, if the target media presentation appliance is not in a specific/localized operation phase, the IPTV distribution node may be adapted to switch to requested media stream (step 7500).

Figure 8:
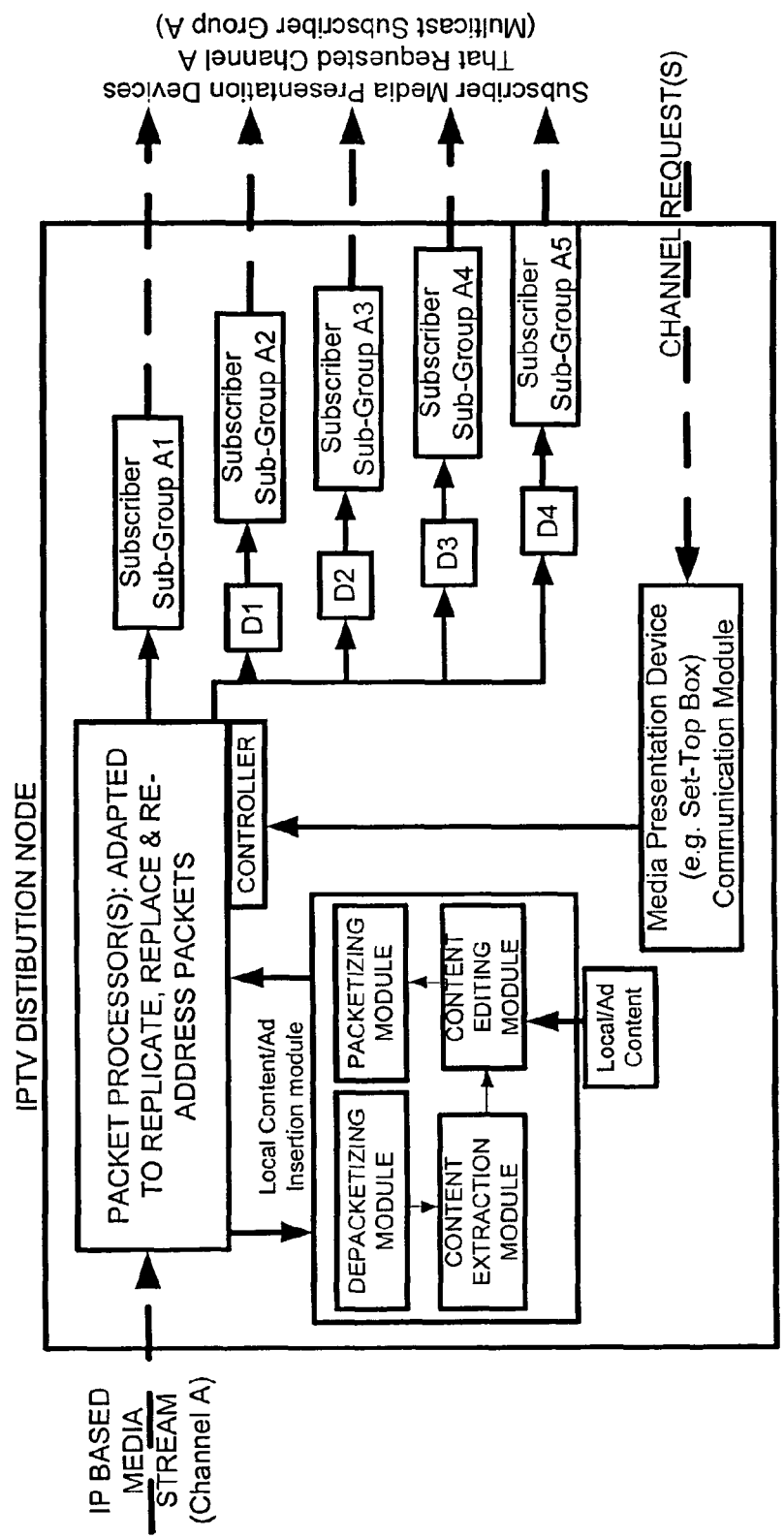
FIG. 8 is a block diagram of an IPTV distribution node, wherein the IPTV distribution node is adapted to derive multiple multicast media streams in accordance with some embodiments of the present invention.
Figure 9:
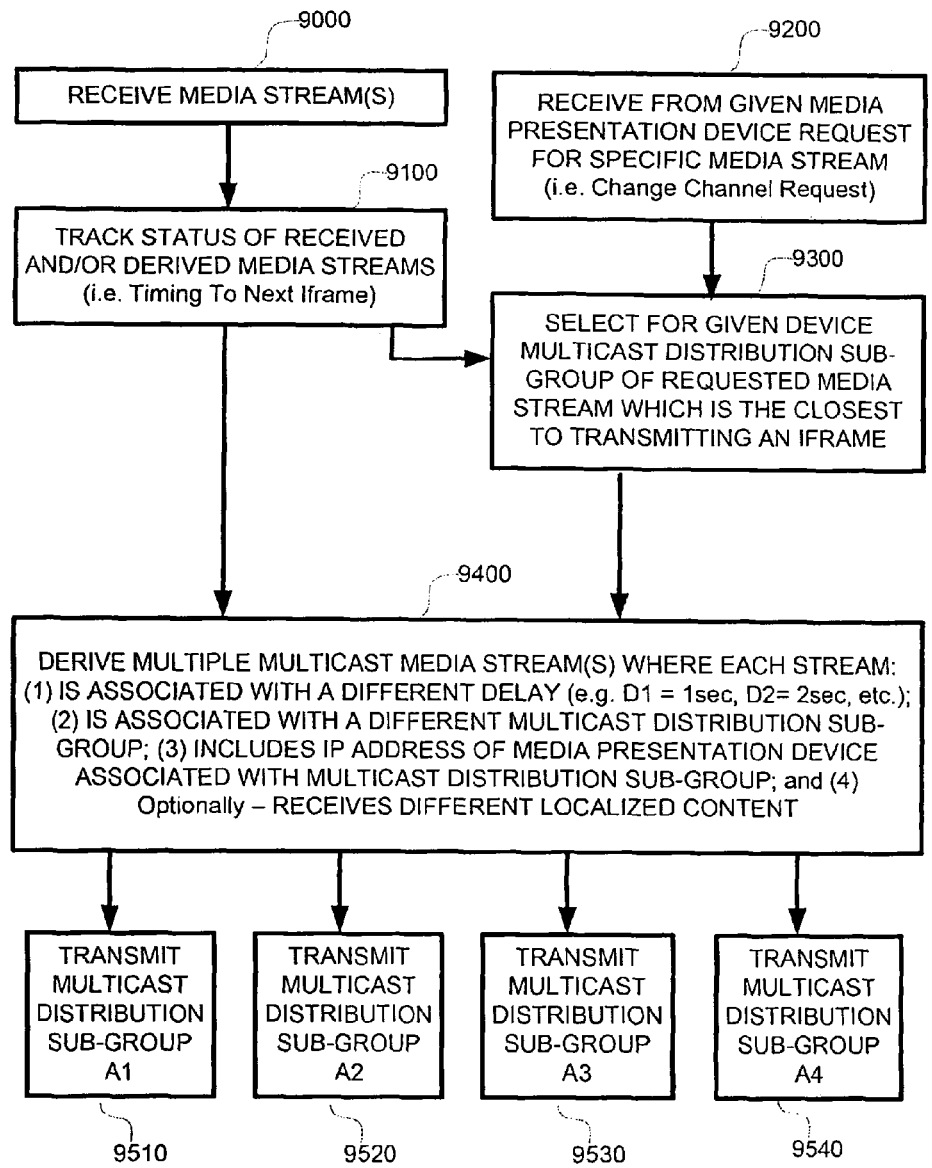
FIG. 9 is a flow chart depicting the steps of an IPTV distribution node, wherein the IPTV distribution node is adapted to derive multiple multicast media streams in accordance with some embodiments of the present invention.

Turning now to FIG. 8, there is shown a block diagram of an IPTV distribution node, wherein the IPTV distribution node is adapted to derive multiple multicast media streams in accordance with some embodiments of the present invention. The IPTV distribution node may include: (1) one or more packet processors, (2) a local content/Ad insertion module, (3) a media presentation device communication module, (4) a controller, and (5) a local/Ad content unit. The functionality of the block diagram shown in FIG. 8 may best be described in conjunction with FIG. 9, there is shown a flow chart depicting the steps of an IPTV distribution node in accordance with some embodiments of the present invention.

According to some embodiments of the present invention, the IPTV distribution node may be adapted to receive one or more media streams ("IP based media streams") as shown in step 9000, the IP media streams may be received by the one or more packet processors, which packet processors may be adapted to replicate, replace and re-address packets. According to yet further embodiments of the present invention, the IPTV distribution node may be adapted to track the status of the received and/or derived media stream (step 9100), for example, the IPTV distribution node may be adapted to track the timing to the next reference frame (intra frame) of a media stream.

According to some embodiments of the present invention, the IPTV distribution node may be adapted to receive from a given media presentation device a request for a specific media stream (step 9200), for example, the IPTV distribution node may be adapted to receive from a given media presentation device a request to change channel ("zap"). According to some embodiments of the present invention, the IPTV distribution node may be adapted to select for a given media presentation device a multicast distribution subgroup of requested media stream (step 9300). According to further embodiment of the present invention, the selected multicast distribution subgroup may be the closest subgroup to transmit an intra frame.

According to some embodiments of the present invention, the IPTV distribution node may be adapted to derive multiple multicast media stream(s) where each stream may: (1) be associated with a different delay time, (2) be associated with a different multicast distribution subgroup, (3) include an IP address of a media presentation device associated with multicast distribution subgroup (as shown in step 9300) and (4) receive different localized content, for example receiving local based content (step 9400). According to yet further embodiments of the present invention, the IPTV distribution node may be adapted to transmit different multicast distribution subgroups (i.e. A1, A2, A3 and A4) as shown in steps 9510, 9520, 9530 and 9540. The different subgroups may be subscriber media presentation device which requested a specific channel, the multicast streams addressed to the different subgroups may each have a different delay time (i.e. D1, D2, D3 and D4) which may be determined based on the tracked status of the received media stream and of the timing parameters of the received request from the given media presentation device.

According to some embodiments of the present invention, the control logic of the IPTV distribution node ("controller") may be adapted to provide a delayed version of the requested media stream ("derived media stream"), wherein the delay may adapt the multicast stream with the request of the given media presentation device based on the status of the received media stream, the request and the status of the media presentation device, an example may be of a delay which is adapted to compensate/reduce zap-time of the given media presentation device.

Figure 10:
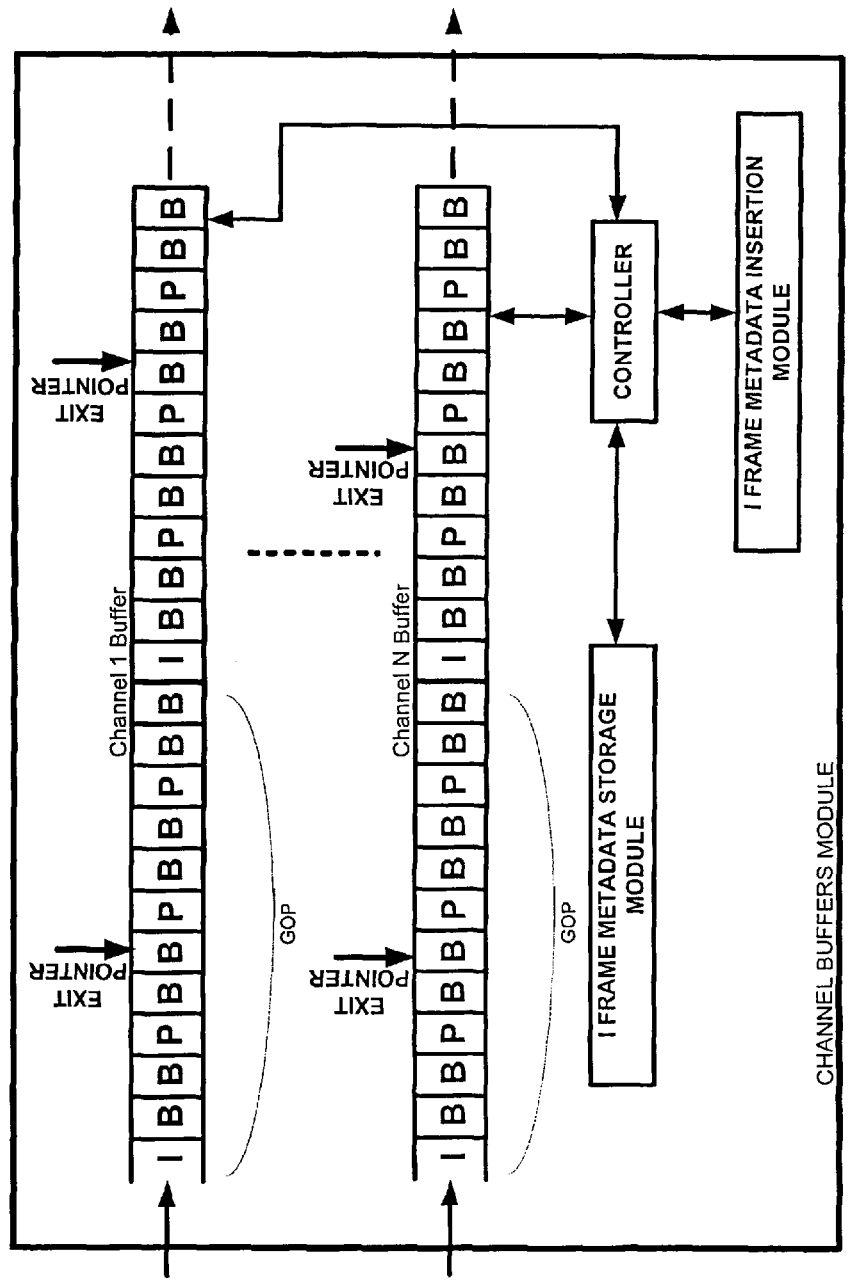
FIG. 10 is a block diagram of a buffering module adapted to (1) associate an intra frame with a Set-Top-Box and (2) add meta-data to the associated intra frame the GOP location need to be modified should include the intra frame and all the following frames till (not including) the next intra frame—in accordance with some embodiments of the present invention.

Turning now to FIG. 10, there is shown a buffering module adapted to (1) associate an intra frame with a Set-Top-Box and (2) add meta-data to the associated intra frame. The buffering module may be part of an IPTV distribution node as shown herein above and specifically in FIGS. 2 and 6 ("cyclic buffer"). According to some embodiments of the present invention, the buffering module may include: (1) one or more dedicated buffers, (2) an encoding meta-data storage module, (3) an encoding meta-data insertion module and (4) a controller.

Figure 11:
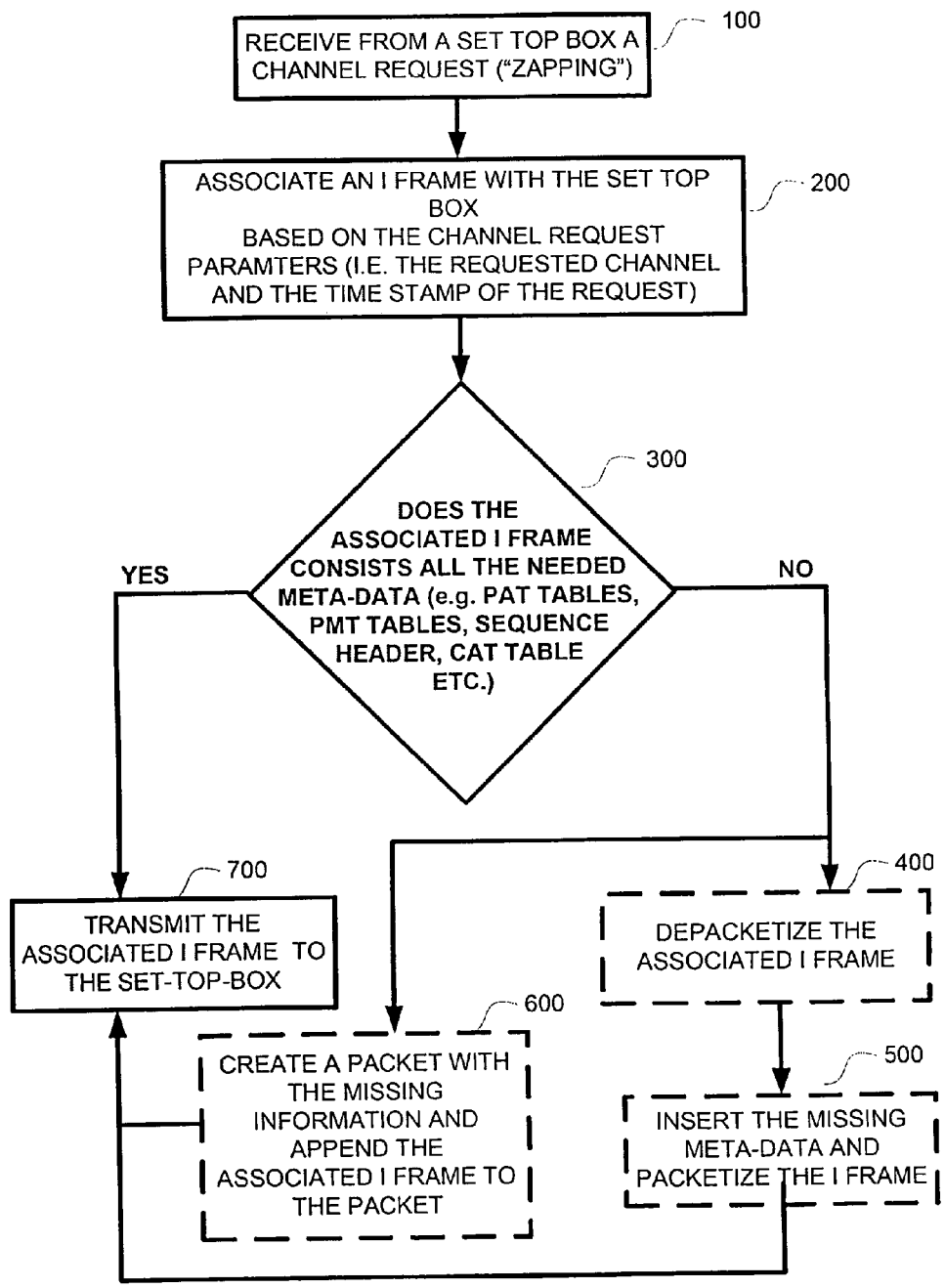
FIG. 11 is a flow chart depicting the steps of a buffering module, wherein the buffering module is adapted to (1) associate an intra frame with a Set-Top-Box and (2) add meta-data to the associated intra frame in accordance with some embodiments of the present invention.

The functionality of the buffering module shown in FIG. 10 may best be described in conjunction with FIG. 11, there is shown a flow chart depicting the steps of a buffering module in accordance with some embodiments of the present invention. According to some embodiments of the present invention, the buffering module may include one or more buffers, wherein each buffer (1) may be dedicated to a specific channel and (2) may be adapted to store a portion of the received media stream, for example: (1) at least one MPEG-2 Group Of Pictures or (2) H.264/AVC video sequences. According to some embodiments of the present invention, a GOP may specify the order in which intra-frames and inter frames are arranged. The GOP is a group of successive pictures within an MPEG-coded video stream. Each MPEG-coded video stream consists of successive GOPs. From the MPEG pictures contained in it the visible frames are generated. A GOP may contain the following picture types:
  a. I-picture or I-frame (intra coded picture) reference picture, corresponds to a fixed image and is independent of other picture types. Each GOP begins with this type of picture.
  b. P-picture or P-frame (predictive coded picture) contains motion-compensated difference information from the preceding I- or P-frame.
  c. B-picture or B-frame (bidirectional predictive coded picture) contains difference information from the preceding and following I- or P-frame within a GOP.
  d. D-picture or D-frame (DC direct coded picture) serves the fast advance.

A GOP may begin with an I-frame. Afterwards several P-frames follow, in each case with some frames distance. In the remaining gaps are B-frames. With the next I-frame a new GOP begins.

According to some embodiments of the present invention, upon receiving a channel request ("zapping") from an STB (step 100), the buffering module may be adapted to associate an intra frame with the STB (step 200), the intra frame may be stored on the buffer which is dedicated to the requested channel. According to further embodiments of the present invention, the buffering module may associate the intra frame with the STB based on parameters of the channel request (e.g. encoding information, etc.). According to further embodiments of the present invention, each dedicated buffer may be associated with one or more pointers (e.g. pointer A, pointer N etc.), wherein each pointer may be associated with a different time interval of channel change request (e.g. pointer A associated with time interval T1-T2 and pointer B associated with time interval T3-T4). An exemplary method of selecting an intra frame ("associated intra frame") after a channel request is: (1) looking at the channel request arrival time, (2) determining which pointer is associated with the arrival time interval and (3) selecting the latest intra frame to that pointer.

According to some embodiments of the present invention, the buffering module may determine whether the associated intra frame has all the meta-data which is needed for completing the zapping request (step 300). The meta-data may include the following portions:
  a. PSI data—Program Specific Information (PSI) is part of MPEG transport stream—
    i. Program Association Table ("PAT")—A PAT has information about all the programs contained in the transport stream. The PAT contains information showing the association of Program Map Table PID and Program Number;
    ii. Program Map Table ("PMT")—This table contains PID numbers of elementary streams associated with the program. In addition it also contains the encrypted messages ECM. The table has information about the type of elementary stream
    iii. Conditional Access Table ("CAT")—This table is used for conditional access to the streams;
    iv. Network Information Table ("NIT");
    v. Transport Stream Description Table ("TDT")
  b. Sequence header—contains information such as width, height and frame rate.

According to some embodiments of the present invention, if the intra frame is missing some of the needed Meta-Data for effectively decoding the GOP associated with the intra frame, then the buffering module may be adapted to add the missing Meta-Data. The buffering module may (1) retrieve the missing meta-data from a meta-data storage module, (2) insert the missing meta-data and (3) packetize the added meta-data to create an IP packet that includes all missing information, this packet will precede the intended intra frame.

According to some embodiments of the present invention, the buffering module is adapted to transmit an intra frame to the Set-Top-Box (step 700), and may do so when the intra frame preceded by the meta-data which is needed for effectively decoding the intra frame and the GOP associated with the intra frame. According to some embodiments of the present invention, the buffering module is adapted to transmit a packet which includes relevant meta-data to the Set-Top-Box (step 600), the packet may be sent in proximity to the associated intra frame.

Figure 12A:
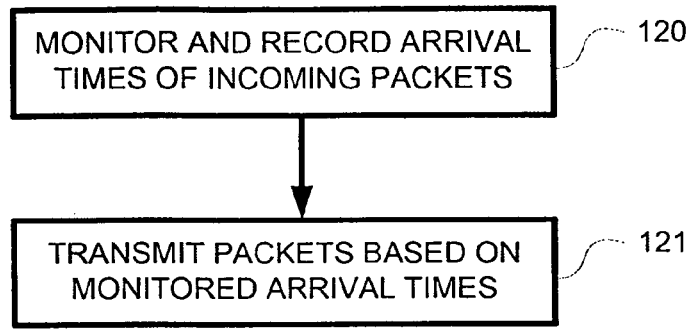
FIG. 12A is a flow chart depicting the steps of a controller in accordance with some embodiments of the present invention.
Figure 12B:
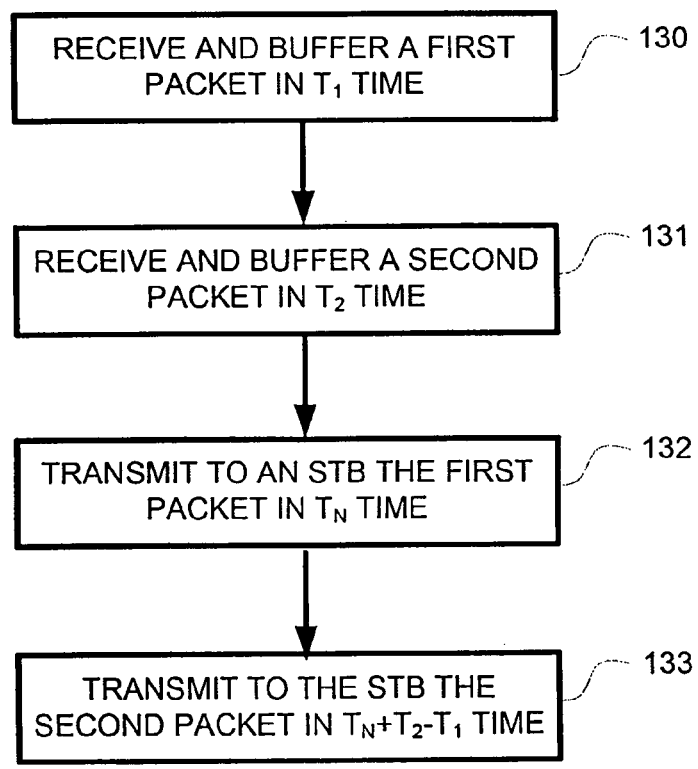
FIG. 12B is a flow chart depicting the steps of an exemplary channel buffers module controller in accordance with some embodiments of the present invention.

Turning now to FIG. 12A, there is shown a flow chart depicting the steps of a controller in accordance with some embodiments of the present invention. According to some embodiments of the present invention, the controller may be adapted to monitor incoming packets (step 120) to the channel buffers module. The controller may store the arrival time of each packet and may regulate the transmission time of the packets to the Set Top Boxes based on the arrival time (step 121), furthermore, the controller may be adapted to set a time interval between the transmission of packets, which time interval may be identical to the time interval (time difference) between the packets arrival time. Turning now to FIG. 12B, there is shown a flow chart depicting the steps of an exemplary channel buffers module controller adapted to monitor the arrival time of packets to the channel buffers module and control the transmission time of the packets based on the arrival time. According to some embodiments of the present invention, the controller may be adapted to receive and buffer a first packet in $T_1$ time (step 130) and receive and buffer a second packet in $T_2$ time (step 131), the controller may be adapted to associate these time indicators with the received packets. According to further embodiments of the present invention, the controller may transmit the first packet in $T_N$ time (step 132). According to yet further embodiments of the present invention, the controller may determine the transmission time of the second packet based on the monitored arrival times, hence, in order to maintain the same time difference between the packets, the controller may transmit the second packet in $T_N+T_2-T_1$ time (step 133).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A device for retransmitting a received IP media stream broadcast, said device comprising:
    a communication module adapted to receive from a media presentation appliance a request for a given IP media stream; and
    a stream generator adapted to convert, in response to the request from the media presentation appliance, one single appliance specific version of the requested media stream from multicast to unicast, and to retransmit with a delay the converted unicast, appliance specific, version of the requested media stream to the media presentation appliance,
    wherein a delay time for the delayed version of the requested media stream is determined to reduce zap-time associated with presenting the requested IP media stream at the media presentation appliance at least partly based on a timing parameter of the request received from the media presentation appliance, and
    wherein content in the unicast appliance specific version of the requested media stream is substantially identical to content in the multicast appliance specific version of the requested media stream
    the device further comprising:
        an appliance specific media stream generator adapted to derive from a first multicast media stream one or more uni-cast media streams or a second multicast media stream,
        wherein the device is further adapted to track a status of the derived one or more uni-cast media streams or the derived second multicast media stream.
2. The device according to claim 1, further comprising a localized content insertion module.
3. The device according to claim 2, further adapted to edit media streams by inserting content.
4. The device according to claim 3, wherein the insertion of content is triggered by a content insertion signal.
5. The device according to claim 1, further including multiple delay segments, wherein each delay segment is associated with a different multicast distribution sub-group.
6. The device according to claim 5, wherein said stream generator is adapted to associate the media presentation appliance with a multicast distribution sub-group which is temporally closest to transmitting an intra frame.

7. The device according to claim 1, further adapted to track the status of received media streams.
8. The device according to claim 1, further adapted to receive a request from a media presentation appliance for a specific media stream.
9. The device according to claim 8, further adapted to transmit different media streams based on a request received from a media presentation appliance.
10. The device of claim 1, wherein:
    the device receives the IP media stream broadcast as a multi-cast media stream addressed to a set of media presentation appliances, including the media presentation appliance; and
    converts the multi-cast media stream into the unicast, appliance specific delayed version.
11. The device of claim 1, wherein the unicast, appliance specific delayed version is provided to the media presentation appliance during only specific operational phases of the media presentation device.
12. The device of claim 11, wherein the specific operational phases include when the media presentation device is transitioning from a first multicast media stream to a second multicast media stream.
13. The device of claim 12, wherein the unicast, appliance specific delayed version of the requested media stream is based on the second multicast media stream.
14. The device of claim 1, wherein the communication module is further adapted to receive from a plurality of other media presentation appliances respective requests for specific IP media streams; and
    wherein the stream generator adapted to convert, in response to each respective one of the requests from the media presentation appliance or any of the other media presentation appliances, one single appliance specific version of the corresponding requested media stream from multicast to unicast, and to retransmit with a delay the converted unicast, appliance specific, version of the requested media stream to the corresponding media presentation appliance,
    wherein a first one of the converted unicast, appliance specific versions retransmitted to a first one of the corresponding media appliances and a second one of the converted unicast, appliance specific versions retransmitted to a first one of the corresponding media appliances have the same content but different delays.
15. A method for retransmitting a received IP media stream broadcast, said method comprising:
    receiving from a media presentation appliance a request for a given IP media stream;
    determining a delay time at least partly based on a timing parameter of the request received from the media presentation appliance;
    converting, in response to the request from the media presentation appliance, one single appliance specific version of the requested media stream from multicast to unicast; and
    providing, in response to the request from the media presentation appliance, a delayed version of the converted unicast appliance specific media stream to the media presentation appliance,
    wherein the delay is determined to reduce zap-time associated with presenting the requested IP media stream at the media presentation appliance, and the delayed version is provided with the determined delay, and wherein content in the unicast appliance specific version of the requested media stream is substantially identical to content in the multicast appliance specific version of the requested media stream the method further comprising:
- deriving from a first multicast media stream one or more uni-cast media streams or a second multicast media stream; and
- tracking a status of the derived one or more uni-cast media streams or the derived second multicast media stream.

16. The method according to claim 15, further comprising inserting localized content.

17. The method according to claim 15, further comprising generating multiple delay segments, wherein each delay segment is associated with a different multicast distribution sub-group.

18. The method according to claim 17, wherein the media presentation appliance requesting a stream is associated with a multicast distribution sub-group which is temporally closest to transmitting an intra frame.

19. The method according to claim 15, further adapted to track the status of received media streams.

20. The method of claim 15, further comprising:
- receiving the IP media stream broadcast as a multi-cast media stream addressed to a set of media presentation appliances, including the media presentation appliance; and
- converting the multi-cast media stream into the unicast, appliance specific delayed version.

21. The method of claim 15, wherein the unicast, appliance specific delayed version is provided to the media presentation appliance during only specific operational phases of the media presentation device.

22. The method of claim 21, wherein the specific operational phases include when the media presentation device is transitioning from a first multicast media stream to a second multicast media stream.

23. The method of claim 22, wherein the unicast, appliance specific delayed version of the requested media stream is based on the second multicast media stream.

24. A method comprising:
- receiving, at a communication module, from a media presentation appliance a request for a given IP media stream, wherein the request has a timing parameter;
- determining a delay time at least partly based on the timing parameter of the request received from the media presentation appliance;
- converting, in response to the request from the media presentation appliance, one single appliance specific version of the requested media stream from multicast to unicast; and
- providing, in response to the request from the media presentation appliance, a delayed version of the converted unicast appliance specific media stream to the media presentation appliance, wherein the delay is determined to reduce zap-time associated with presenting the requested IP media stream at the media presentation appliance, and the delayed version is provided with the determined delay, wherein the unicast, appliance specific delayed version is provided to the media presentation appliance during only specific operational phases of the media presentation device, wherein the specific operational phases include when the media presentation device is transitioning from a first multicast media stream to a second multicast media stream, and wherein the unicast, appliance specific delayed version of the requested media stream is based on the second multicast media stream, the method further comprising:
- deriving from a first multicast media stream one or more uni-cast media streams or a second multicast media stream; and
- tracking a status of the derived one or more uni-cast media streams or the derived second multicast media stream.

* * * * *